(12) United States Patent
Nagler

(10) Patent No.: US 9,904,032 B2
(45) Date of Patent: Feb. 27, 2018

(54) MACRO ACCESSORY FOR TELESCOPE

(71) Applicant: TELE VUE OPTICS, INC., Chester, NY (US)

(72) Inventor: Albert Nagler, Wanaque, NJ (US)

(73) Assignee: TELE VUE OPTICS, INC., Chester, NY (US)

( * ) Notice: Subject to any disclaimer, the term of this patent is extended or adjusted under 35 U.S.C. 154(b) by 141 days.

(21) Appl. No.: 14/938,190

(22) Filed: Nov. 11, 2015

(65) Prior Publication Data

US 2017/0131517 A1 May 11, 2017

(51) Int. Cl.
| | |
|---|---|
| *G02B 13/00* | (2006.01) |
| *G02B 7/105* | (2006.01) |
| *G02B 23/16* | (2006.01) |
| *G02B 7/02* | (2006.01) |
| *G02B 1/11* | (2015.01) |

(52) U.S. Cl.
CPC ............ *G02B 7/105* (2013.01); *G02B 1/11* (2013.01); *G02B 7/021* (2013.01); *G02B 23/16* (2013.01)

(58) Field of Classification Search
CPC .......... G02B 15/10; G02B 15/22; G02B 7/10; G02B 7/022; G02B 7/105; G02B 7/021; G02B 23/16; G02B 1/11
USPC ................................... 359/99–431, 693, 705
See application file for complete search history.

(56) References Cited

U.S. PATENT DOCUMENTS

| | | | |
|---|---|---|---|
| 4,486,069 A | 12/1984 | Neil et al. | |
| 5,022,724 A | 6/1991 | Shechterman | |
| 5,691,842 A | 11/1997 | Devenyi et al. | |
| 5,764,410 A | 6/1998 | Jibiki | |
| 6,487,809 B1 | 12/2002 | Gaber | |
| 7,808,718 B2 * | 10/2010 | Frazier | G02B 13/04 359/673 |
| 8,355,211 B2 * | 1/2013 | Frazier | G02B 13/04 359/673 |
| 8,861,097 B2 * | 10/2014 | Frazier | G03B 17/14 359/431 |
| 2007/0109635 A1 | 5/2007 | Albrecht et al. | |
| 2011/0194177 A1 | 8/2011 | Szapiel et al. | |
| 2014/0259853 A1 | 9/2014 | Crispin | |

OTHER PUBLICATIONS

Carnathan. Canon 500D Close-up Lens. https://web.archive.org/web/20040301124118/https://www.the-digital-picture.com/Reviews/Canon-500D-Close-up-Lens-Review.aspx available as of Mar. 1, 2004.*

(Continued)

*Primary Examiner* — Bumsuk Won
*Assistant Examiner* — Collin X Beatty
(74) *Attorney, Agent, or Firm* — Gottlieb, Rackman & Reisman, PC

(57) ABSTRACT

An optical macro adaptor assembly comprising two or more lens components arranged successively along the optical axis thereof, configured to be mounted in front of the objective lens of a telescope, and acting to reduce the minimum focus distance of the telescope to permit the telescope to be used in environments requiring a close focus. The optical macro assembly can be a Galilean-type optical system of approximately unit magnification with adjustable spacing between the lens elements to allow for focusing.

15 Claims, 2 Drawing Sheets

(56) References Cited

OTHER PUBLICATIONS

B&H Photo.Video.Pro Audio, Leupold Alumina 50-Foot Focus Adapter (Matte Black), http://www.bhphotovideo.com/c/product/372975-REG/Leupold, pp. 1-5.

John McQuay, 8541 Tactical I.O.T.A. (Indoor Optical Training Aid), http://8541tactical.com/IOTA__review.php, Jan. 27, 2011, pp. 1-2.

The International Searching Authority, Patent Cooperation Treaty PCT International application No. PCT/US2016/060930, Notification of Transmittal of the International Search Report and the Written Opinion of the International Searching Authority or the Declaration, Jan. 19, 2017, pp. 1-11.

\* cited by examiner

MACRO ACCESSORY FOR TELESCOPE

FIELD OF THE INVENTION

The present invention relates to an optical macro accessory that reduces the minimum focus distance of a telescope system.

BACKGROUND

Telescopic systems, such as spotting scopes and riflescopes, as well as astronomical and other telescope systems, typically do not have very close focus capability since this is not a requirement for the intended use of the device. For example, many astronomical telescopes cannot be focused on targets that are closer than several meters away. Likewise many spotting scopes used for various sport, hobby, and commercial applications lack close focus ability. Another telescope device is a riflescope. These are frequently designed to focus from infinity to about 50 meters and typically have only a very limited ability to adjust the focus. Even specialty rifle scopes which have adjustable objective lenses are not designed to focus on nearby targets only a few meters away.

As a result, these telescopes cannot be used for applications in which a close focus capability is needed. Such close focus applications may include visual close-ups of nearby birds, insect studies in the field, and close inspection of equipment in nearby hazardous or inaccessible environments. In addition, the lack of a close focus capability makes testing or training uses of the telescope more cumbersome since a target placed nearby cannot be brought into focus. One example is telescopic photography system testing during which the optical system must be focused on a target. A different example is marksman "dry-fire" training during which various aspects of riflery can be practiced, such as trigger training during which a marksman observes the target through the scope while pulling the trigger to try and minimize the motion of the gun. The lack of a close-focus capability limits indoor applicant and training uses because many indoor facilities do not have very a long clear line of sight where the telescope and target can be set up. Similarly, the lack of a close-focus capability may prevent repurposing of existing telescope equipment for alternative applications requiring a close-focus.

It is known to use a fixed single-element conversion lens attached to the front of a conventional camera lens to increase or decrease the lens' focal length and allow for an increased zoom capability, such as a 2× tele-converter for converting a 3× zoom to a 6× zoom lens or a 0.5× wide angle converter providing a wide angle or even a "fisheye" field of view. However, it is not always desired to substantially alter the magnification or field of view of a lens system. Accordingly, it would be beneficial to provide an optical macro adaptor which can be coupled to the objective end of a telescope and provide the telescope system with a closer than normal telescopic focus range while preserving the telescope's magnification and field of view.

It is known to attach a single lens stopped down by about ⅔ of its diameter to the front of rifle scope to provide for a limited close-focus capability. The stopping is a conventional way to avoid introducing optical aberrations which would otherwise be caused by the portions of the lens far from its optical center. The extensive stopping provides a significant reduction in light gathering capability. As a result, this lens is suitable for use only in very bright conditions.

It would be a further benefit to provide an adaptor that introduced minimal optical aberrations without requiring the lenses in the adaptors to be stopped down so that as much of the telescope's original aperture as possible can be utilized.

It would be a further benefit if such an adaptor itself could be focused to provide additional flexibility of the telescope system in close-focus applications.

SUMMARY

These and other issues are addressed by aspects of the present invention which provides an optical macro accessory that can be attached to the objective, end of a telescope to permit very close-focus. The macro adapter is comprised of a housing with two or ore lens modules arranged successively along the optical axis. The lens modules cooperate to form an optical assembly with approximately unit power and which operates to reduce the minimum focus distance of the telescope to which it is attached. In one embodiment, the optical modules of the adaptor are configured as a Galilean-type optical system in which the first lens module is a converging optical element and the second lens module is a diverging optical element. For example, the first lens module can be a single double convex lens and the second lens module can be a single double concave lens.

The adaptor has a telescope mount that can connect the back of the adaptor to the objective side of the telescope. The mount can comprise threads on the adaptor which permit it to be screwed to the telescope directly or connected indirectly through the use of threaded rings of appropriate diameters. Alternatively, the telescope mount can include a metal, plastic, or rubber cylinder that slips over the end of the telescope tube.

The simple function and compact design of the adaptor allows for convenient addition or removal from the telescope's front housing. The optical elements in the adaptor can be selected and arranged to provide the telescope with close focus capability without substantial alteration to the telescopic instrument's magnification, preserving the field of view of the instrument, and minimizing axial and lateral chromatic aberration and other optical aberrations over the focus range. Use of low cost, common glass types such as BAK4 and BK7, combined with anti-reflective coatings assure reasonable cost and retention of the telescopic instrument's inherent contrast.

The adaptor can also be configured to allow for independent focusing as well by mounting the lens modules so as to allow their spacing to be varied axially between, for example about 4 mm to about 20 mm. When attached to the front of a telescopic system set to infinity focus, the adaptor can be used, for example, to bring objects from 50 meters to as close as 2 meters or less into focus.

In one application, the adaptor can be attached to the end of an astronomical telescope lacking close focus capability so as to permit indoor testing of or practice in the use of the telescope for applications in which the operator must be able to bring an object into focus. In another application, the adaptor can be attached to the end of a riflescope to allow the scope to focus on a nearby target for trigger training and other applications. When used with a riflescope, the ability to focus the adaptor is particularly useful since rifle scopes often have limited or no applicable focusing ability. The adaptor's focus can thus be used to adjust the focus on the target instead of the operator having to change the distance between the entire rifle and the target to get a good focus.

BRIEF DESCRIPTION OF THE FIGURES

These and other features and advantages of the invention, as well as structure and operation of various implementations of the invention, are disclosed in detail below with references to the accompanying drawings.

DETAILED DESCRIPTION OF PREFERRED EMBODIMENTS

Figure 1:
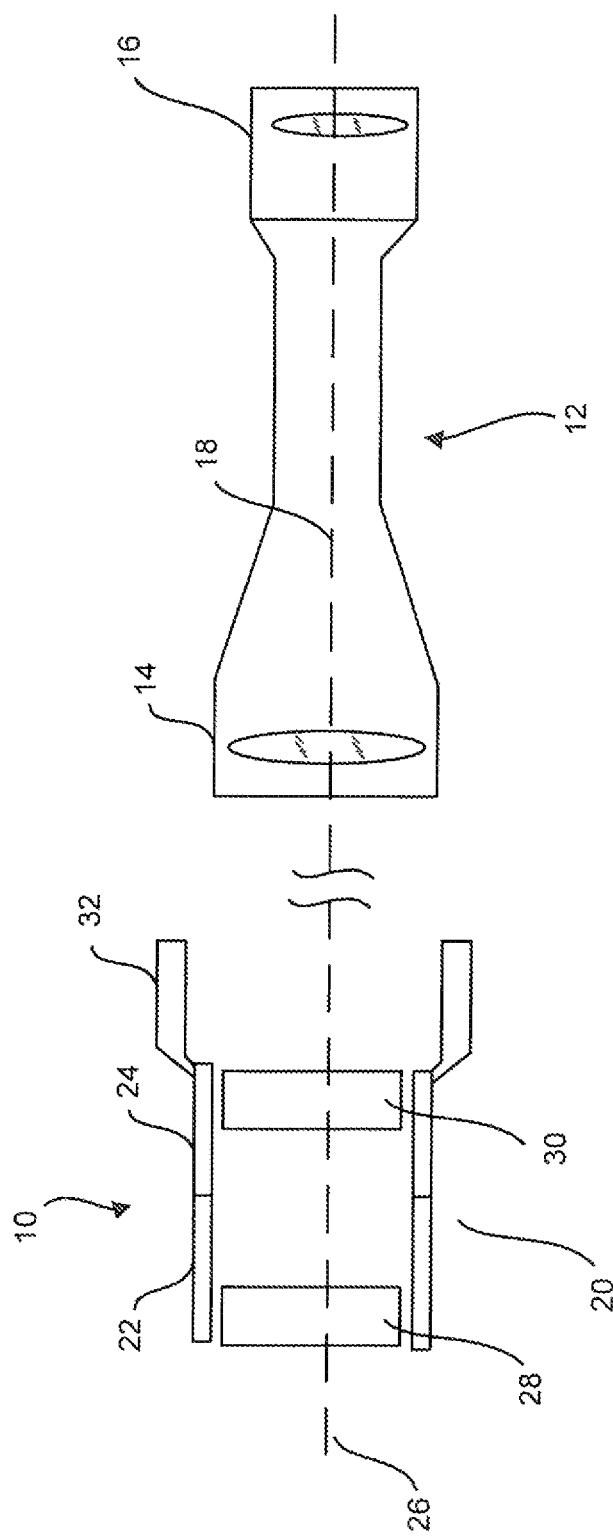
FIG. 1 is a block diagram showing a cross section of a general embodiment of the adaptor according to aspects of the present invention and a telescope.

Turning to FIG. 1, there is shown a block diagram of a cross section of a general embodiment of the macro adaptor 10 according to the present invention. The adaptor 10 is shown adjacent a telescope 12 having an objective lens 14, an eyepiece 16, and an optical axis 18. The telescope 12 has a typical focus distance from infinity to 50 meters. Telescope 12 can be any type of telescope such as a telescope for visual or photographic astronomy or observation, a rifle or other scope, or other type of instrument. The adaptor 10 and telescope 12 are conventionally cylindrical, with a circular cross-section, and this configuration is addressed herein. However, the invention is not so limited and the macro adaptor 10 can be used with telescopes of other configurations.

The macro adaptor 10 has a housing 20 with first and second portions 22 and 24 and a central optical axis 26. A first lens module 28 is mounted in the first portion of the housing 22 and second lens module 30 is mounted in the second portion of the housing 24. Both lens modules 28, 30 are aligned with the optical axis 26. The first and second tens modules cooperate to form an optical assembly with approximately unit power and which, when the second portion 30 of the adaptor 10 is mounted to the objective end of the telescope 12, operate to reduce the minimum focus distance of the telescope. In a more specific embodiment, the first and second lens modules form a Galilean-type optical system in which the first lens module is a converging optical element and the second lens module is a diverging optical element. Even more specifically, the first lens module can be a single double convex lens and the second lens module can be a single double concave lens. One or more doublet or other compound lenses can be used instead and other alternative lens configurations are also possible. A Galilean optical assembly allows for a compact configuration that preserves image orientation and can be configured to maintain the telescope's field of view without requiring the lenses in the adaptor 10 to be stopped down to reduce optical aberrations. Non-Galilean optical configurations may also be used, although they may be less suitable for the applications discussed herein. One such alternative may include two widely spaced positive lenses with a focal point between them.

The second portion 24 of the adaptor 10 has a mounting part which can be used to attach the adaptor 10 directly or indirectly to the objective end of the telescope 12 so that the optical axis 26 of the adaptor is aligned with the optical axis 18 of the telescope. Various configurations can be used for this purpose and mounting part will typically include a threaded portion on the second portion 24 adaptor 10. In FIG. 1, a metal, plastic, or rubber cylinder 32 that is sized to slip snugly over the end of the telescope tube is removably attached to the end of the second portion 24 of adapter 10, although it could be permanently mounted instead. Screws (not shown) can be provided to hold the cylinder 32 in place on the telescope. Alternatively, and as discussed further with respect to FIG. 2, the adaptor 10 can be attached to the telescope by a threaded assembly on second portion 24 that can be screwed into corresponding threads on the end of the telescope 12 directly or by means of one or more threaded rings. A wide variety of threaded mounting rings are commercially available permitting a single sized adaptor 10 to be easily coupled to a variety of differently sized telescopes. Other mounting configurations can also be used.

The adaptor 10 can also be configured to allow for focusing by mounting the lens modules 28, 30 so that their axial spacing can easily be adjusted by a user. The range of adjustable spacing for focusing can be selected based on the specific optical parameters of the adaptor 10 and the type of device to which it may be intended to connect and whether that device has its own focusing ability which may be used when the adaptor 10 is mounted. A variety of focusing mechanisms known to those of skill in the art can be used, such as a rack and pinion, Crayford, or helical focuser designs. In particular embodiments, the focusing mechanism used can be similar to that in the TeleVue® Paracorr™ coma corrector with a slidable barrel and clamping screw or the TeleVue® DeLite™ eyepiece with a slidable barrel and locking ring.

Figure 2:
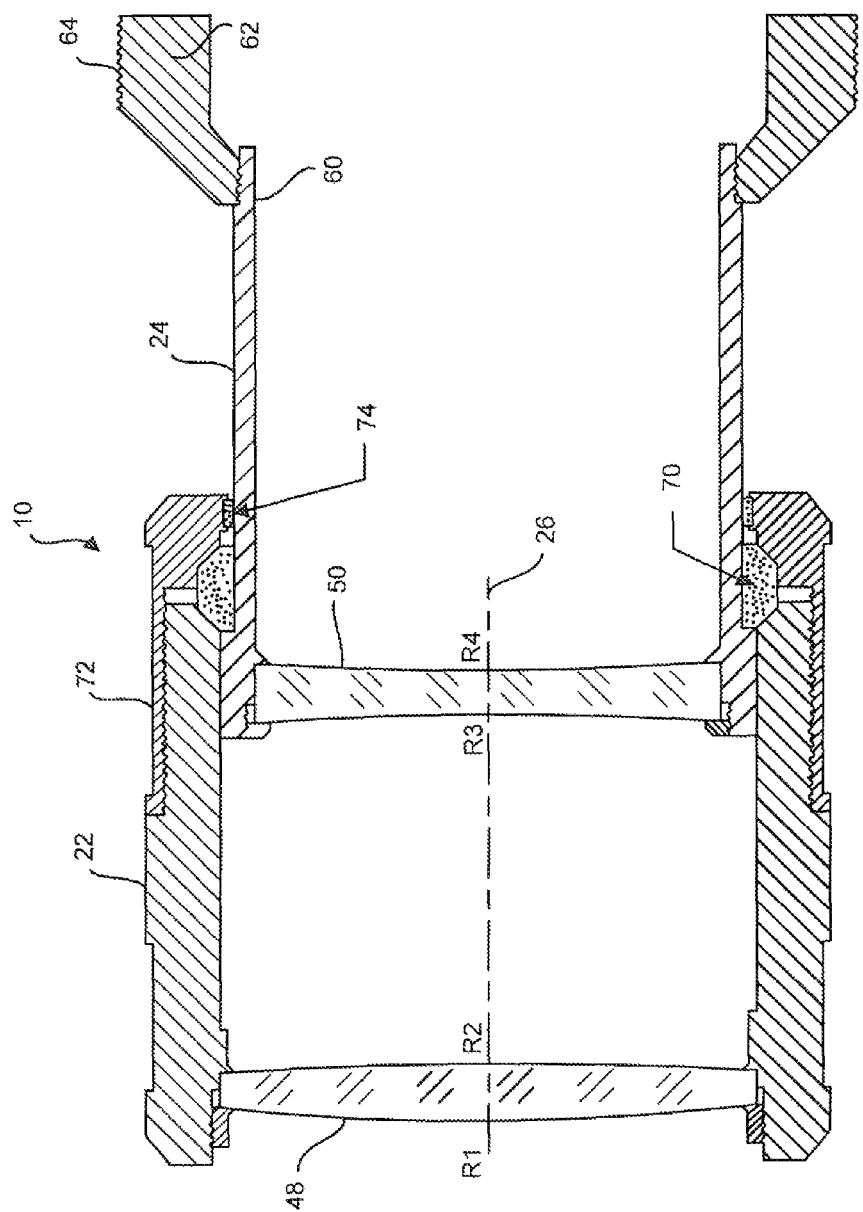
FIG. 2 is a schematic cross-sectional diagram of a particular embodiment of the adaptor according to aspects of the present invention.

FIG. 2 shows one specific embodiment of the adaptor 10 configured as a Galilean-type optical system in which the first lens module is a converging optical element and the second lens module is a diverging optical element. In the illustrated embodiment of FIG. 2, the first lens module is a single double convex lens 48 with an outer radius R1 and an inner radius R2. The second lens module is a single double concave lens 50 with an inner radius R3 and an outer radius R4.

In one configuration of the embodiment of FIG. 2, lens 48 has an axial thickness of about 4 mm, an outer Radius R1 of about 150 mm and an inner Radius R2 of about −290 mm. Lens 48 is formed of a material with a refractive index of about 1.5, such as 1.517, and an Abbe number of about 64, such as 64.2. A suitable material is BK7 glass. Lens 50 has an axial thickness of about 3 mm, an inner Radius R3 of about −220 mm and an outer Radius R4 of about 220 mm. Lens 50 is formed of a material with a refractive index of about 1.6, such as 1.569, and an Abbe number of about 56, such as 56.3. A suitable material is BAK4 glass. Anti-reflection coatings may also be applied to the lenses.

The mounting part shown in FIG. 2 is comprised of a threaded portion 60 along the outside of the end of the second portion 24 which permits the adaptor 10 to be connected directly or indirectly to the objective end of the telescope 12. FIG. 2 shows a mounting ring 62 screwed onto the threaded portion 60. The mounting ring 62 has additional threads 64 which can be engaged to a corresponding threaded portion of the telescope or to other differently sized rings as needed to fit the adaptor to the objective end of the telescope 12. In addition, as noted above, instead of rings, a suitably sized mounting cylinder that fits over the objective end of the telescope 12 can be provided.

The spacing between lens 48 and 50 can be varied by moving the second portion 24 axially relative to the first portion 2 of the adaptor 10. The second portion 24 is supported within the first portion 22 by a frictional bushing 70. The focus can be locked by a locking ring 72 which can be turned to increase or decrease the pressure on the frictional bushing 70. A felt ring 74 can be provided to help maintain axial alignment of the second portion 24 as it is moved in and out of the first portion 22. In this most specific embodiment, the lens spacing can be varied across a range of from about 4 mm to about 20 mm. When attached to the front of a telescopic system set to infinity focus, the adaptor can be used, for example, to bring objects from 50 meters to as close as 2 meters distance into focus. This generally unit-power Galilean arrangement avoids introducing aberrations that might compromise instrument resolution, axial and lateral chromatic aberration or field of view of the instrument. Its simple function and compact design allows it to be conveniently added to or removed from telescope's front housing. Use of low cost, common glass types and multi-coatings assure reasonable cost and retention of the instrument's inherent contrast.

Various aspects of the invention have been disclosed and described herein. However, various modifications, additions and alterations may be made by one skilled in the art without departing from the spirit and scope of the invention as defined in the appended claims.

What is claimed is:

1. A macro adaptor for a telescope, the telescope having a minimum focus distance, the macro adaptor comprising:
   a housing having a first portion, a second portion and an optical axis, the first and second portions being axially movable relative to each other along the central axis;
   a first positive lens module in the first portion of the housing and aligned with the optical axis;
   a second negative lens module spaced apart from the first lens module and mounted in the second portion of the housing and aligned with the optical axis;
   the first and second lens modules cooperating to form an optical assembly with approximately unit power;
   a mount at the second portion configured to permit the housing to be attached to an objective end of the telescope with the optical axis of the housing generally aligned with an optical axis of the telescope;
   wherein the first and second lens modules are configured to reduce the minimum focus distance of the telescope when the macro adaptor is mounted to the telescope.

2. The macro adaptor of claim 1, wherein the first lens module is a single first lens that is double convex and the second lens module is a single second lens that is double concave.

3. The macro adaptor of claim 2, wherein:
   the first lens has a first side with a first convex radius of about 150 mm, a second side with a second convex radius of about 290 mm, an axial thickness of about 4 mm and is formed of a material with a refractive index of about 1.5 and an Abbe number of about 64; and
   the second lens has a first side with a concave radius of about 220 mm and a second side with a second concave radius of about 220 mm an axial thickness of about 3 mm and is formed of a material with a refractive index of about 1.6 and an Abbe number of about 56; and
   wherein the second side of the first lens is facing the first side of the second lens; and wherein axial motion of the first and second portions relative to each other can vary a spacing between the first and second lenses from about 4 mm to at least 24 mm.

4. The macro adaptor of claim 1 wherein the mounting part comprises a threaded region to which a threaded ring or cylinder can be attached.

5. A macro adaptor and telescope assembly comprising:
   a telescope having an objective end and an eyepiece end, the telescope having a first minimum focus distance;
   a macro adaptor comprising:
      a housing having a first portion, a second portion and an optical axis, the first and second portions being axially movable relative to each other along the central axis;
      a first positive lens module in the first portion of the housing and aligned with the optical axis;
      a second negative lens module spaced apart from the first lens module and mounted in the second portion of the housing and aligned with the optical axis;
      the first and second lens modules cooperating to form an optical assembly with approximately unit power;
      the second portion of the macro adaptor housing being removably coupled to the objective end of the telescope with the optical axis of the housing being generally aligned with an optical axis of the telescope;
      the combined telescope and macro adaptor having a second minimum focus distance, the first and second lens modules being configured so that the second minimum focus distance is significantly less than the first minimum focus distance.

6. The assembly of claim 5, wherein the first minimum focus distance is about 50 meters or greater and the second minimum focus distance is about 2 meters or less.

7. The assembly of claim 5, wherein the first lens module is a single first lens that is double convex and the second lens module is a single second lens that is double concave.

8. The assembly of claim 7, wherein:
   the first lens has a first side with a first convex radius of about 150 mm, a second side with a second convex radius of about 290 mm, an axial thickness of about 4 mm and is formed of a material with a refractive index of about 1.5 and an Abbe number of about 64; and
   the second lens has a first side with a concave radius of about 220 mm and a second side with a second concave radius of about 220 mm an axial thickness of about 3 mm and is formed of a material with a refractive index of about 1.6 and an Abbe number of about 56; and
   wherein the second side of the first lens is facing the first side of the second lens; and wherein axial motion of the first and second portions relative to each other can vary a spacing between the first and second lenses from about 4 mm to at least 24 mm.

9. The macro adaptor of claim 1, wherein the first and second lens modules are configured to substantially reduce the minimum focus distance of the telescope.

10. The macro adaptor of claim 1 wherein when the minimum focus distance of the telescope is about 50 meters or greater and the first and second lens modules reduce the minimum focus distance to about 2 meters or less.

11. The macro adaptor of claim 1 wherein the mount comprises a cylinder sized to fit over the objective end of the telescope.

12. The assembly of claim 5 wherein the second portion of the macro adaptor comprises a threaded region configured to removably couple the macro adaptor to the objective end of the telescope.

13. The assembly of claim 5 wherein the second portion of the macro adaptor housing is removably coupled to the objective end of the telescope with a mounting portion comprising a cylinder sized to fit over the objective end of the telescope.

14. The assembly of claim 5, wherein the telescope is a rifle scope.

15. The assembly of claim 5 wherein the telescope is not independently focusable.

* * * * *